(12) United States Patent
Nakano et al.

(10) Patent No.: US 7,587,506 B2
(45) Date of Patent: Sep. 8, 2009

(54) COMPUTER SYSTEM AND DATA BACKUP METHOD IN COMPUTER SYSTEM

(75) Inventors: Takahiro Nakano, Yokohama (JP); Yoji Nakatani, Yokohama (JP); Etsutaro Akagawa, Kawasaki (JP); Hitoshi Kamei, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 11/125,244

(22) Filed: May 10, 2005

(65) Prior Publication Data

US 2006/0206747 A1 Sep. 14, 2006

(30) Foreign Application Priority Data

Mar. 9, 2005 (JP) ............................. 2005-064690

(51) Int. Cl.
*G06F 15/16* (2006.01)

(52) U.S. Cl. ..................... 709/230; 709/211; 709/208; 709/203; 709/209; 709/210

(58) Field of Classification Search ................. 709/203, 709/204, 219, 206, 230, 211, 208–210
See application file for complete search history.

(56) References Cited

U.S. PATENT DOCUMENTS 5,829,046 A * 10/1998 Tzelnic et al. .............. 711/162
6,460,113 B1 10/2002 Schubert et al.
7,212,962 B2 * 5/2007 Masushige et al. ............ 703/24
2002/0103889 A1 8/2002 Markson et al.
2003/0149746 A1 * 8/2003 Baldwin et al. ............. 709/219
2004/0143608 A1 7/2004 Nakano et al.

FOREIGN PATENT DOCUMENTS

WO 0184265 11/2001

* cited by examiner

*Primary Examiner*—Ario Etienne
*Assistant Examiner*—Sahera Halim
(74) *Attorney, Agent, or Firm*—Brundidge & Stanger, P.C.

(57) ABSTRACT

A data intermediate server 300 comprises the functions of reading data stored in storage servers ST1 through ST3 and sending the data to a media server 600 according to backup commands received from a backup control device 400 over a local area network LAN4. The data intermediate server 300 and the storage servers ST1 through ST3 are connected by channels that do not permit Internet protocol traffic but only data targeted for backup and control data assigned thereto. As a result, client data stored on the storage servers can be properly backed up while preventing data from being improperly retrieved or leaked.

20 Claims, 11 Drawing Sheets

Fig.3

RESOURCE ALLOCATION TABLE

| PROCESS | MEMORY SPACE | DISK AREA | NETWORK INTERFACE | MAXIMUM CPU UTILIZATION | RECEPTION BUFFER |
|---|---|---|---|---|---|
| VIRTUAL STORAGE SERVER PROGRAM | 0x10000000~ 0x1fffffff | /mnt/dk1/ | NIC1 | 60% | 0x1f000000~ 0x1fffffff |
| VIRTUAL STORAGE SERVER PROGRAM | 0x20000000~ 0x2fffffff | /mnt/dk2/ | NIC2 | 60% | 0x2f000000~ 0x2fffffff |
| VIRTUAL STORAGE SERVER PROGRAM | 0x30000000~ 0x3fffffff | /mnt/dk3/ | NIC3 | 60% | 0x3f000000~ 0x3fffffff |
| VIRTUAL DATA RELAY SERVER PROGRAM | 0x40000000~ 0x4fffffff | | NIC4 | 70% | 0x4d000000~ 0x4dffffff 0x4e000000~ 0x4effffff 0x4f000000~ 0x4fffffff |

STORAGE SERVER TABLE

TB2

| IDENTIFICATION PATH | STORAGE SERVER NAME | INTERFACE |
|---|---|---|
| /vnas1 | vnas1 | RECEPTION BUFFERS 1, A |
| /vnas2 | vnas2 | RECEPTION BUFFERS 2, B |
| /vnas3 | vnas3 | RECEPTION BUFFERS 3, C |

Fig.8

FILE LIST

| No. | FILES TARGETED FOR BACKUP |
|---|---|
| 1 | /vnas1/secret.txt |
| 2 | /vnas1/htmldocs/* |
| 3 | /vnas2/user/userlist.db |
| 4 | /vnas2/database/customer.db |
| 5 | /vnas3/archive.zip |
| 6 | /vnas3/log/* |
| ⋮ | ⋮ |

FILE LIST FOR vnas1

FILE LIST FOR vnas2

FILE LIST FOR vnas3

STORAGE SERVER TABLE

| IDENTIFICATION PATH | STORAGE SERVER NAME | INTERFACE |
|---|---|---|
| /vnas1 | vnas1 | COM1, COMa |
| /vnas2 | vnas2 | COM2, COMb |
| /vnas3 | vnas3 | COM3, COMc |

COMPUTER SYSTEM AND DATA BACKUP METHOD IN COMPUTER SYSTEM

CLAIM OF PRIORITY

The present application claims priority from Japanese Application P2005-64690 filed on Mar. 9, 2005, the content of which is hereby incorporated by reference into this application.

BACKGROUND

The present invention relates to a technique for backing up data stored on storage servers in a computer system comprising individual storage servers for each client connected over the Internet.

Storage servers which store data used by servers and clients are important for periodically backing up data in order to prevent accidental loss of data. Data can be backed up, for example, to certain recording media by sending the data to a media server connected by a fiber network to the storage servers (see, for example, U.S. Pat. No. 6,460,113). Examples of backup recording media which can be used include portable recording media such as tape media, optical disks, and opticomagnetic disks, as well as stationary recording media such as magnetic disks and semiconductor memory devices.

Recently there has been continuing development of services which involve exclusive maintenance and management of storage servers, web servers, and the like, and which give clients access to the functions of such devices over the Internet. Ordinarily, such servers are located in facilities referred to as data centers managed by service providers. Storage servers located in data centers are sometimes individually prepared for each client to limit access by other clients.

An example of a method for backing up data stored in storage servers in such a data center is to individually prepare media servers for each client in the same manner as storage servers. In this method, however, the increase in facility resources and the greater complexity of the facilities can result in the risk of less maintenance. One possible solution is to connect one media server over a network to a plurality of storage servers. However, in that method, the storage servers for which pains have been taken to individually provide each client end up being connected to each other over the network, with the danger of client data leaking over the network during data backup to other clients.

SUMMARY

In view of these various problems, an object of the present invention is to control the increase in facility resources and to properly back up client data while controlling data leaks.

The computer system of the present invention is constructed in the following manner based on the above objectives. Specifically, the gist of the invention is a computer system that is equipped with individual storage servers for predetermined sections that are accessed over the Internet, comprising:

a backup device that backs up data stored in the storage servers;

a data intermediate server that is connected to the storage severs and backup device, and that reads data from the storage servers according to backup commands received from the backup device and transmits the read data to the backup device; and backup channels that connect the storage servers and data intermediate server, and that exchange data based on a communication procedure that is different from the protocol used by the Internet in cases where data is read from the storage servers by the data intermediate server.

In the computer system of the invention, a data intermediate server is located between the storage servers and backup device. The data intermediate server and the storage servers are connected by backup channels in which the exchange of data is based no a communication procedure that is different from the protocol used by the Internet. Client computers which connect over the Internet to the computer system thus have limited access to the backup device beyond the storage server. That is, according to the present invention, during the backup of data stored on the storage servers, client data transmitted between the data intermediate server and backup device can be prevented from leaking or being improperly accessed by other clients, and the data can be properly backed up. According to the structure of the present invention, a computer system can be built at a lower cost, without the need for setting up individual backup devices for each storage server. The predetermined sections can also be divided, for example, according to client or differences such as client departments.

In a computer system with the above structure, the data intermediate server and backup device may be connected by a network that communicates based on the same protocol as the protocol used by the Internet. This will allow the backup device and data intermediate server to be connected using a general purpose network machine.

Here, the protocol used by the Internet can be the Internet Protocol. The Internet Protocol is a communication protocol located at the network layer of the OSI reference model defined by the International Standards Organization, and communicates between nodes based on IP addresses assigned to each node on a network.

The storage servers and data intermediate server may also be connected by a channel from among USB, serial interfaces, Infiniband, and fiber channels as the backup channels. Serial bus interface standard defined as IEEE1394, which offer high-speed communications and isochronous real-time data services may be used for the backup channels. Only protocols that are not compatible with Internet protocols, such as IPX/SPX or NetBEUI, for example, should be used for communications on such channels, which may be physically connected by a channel with the same standards to the network used to connect the backup device and data intermediate server (such as Ethernet (registered trademark)).

In the computer system with the above structure, the storage servers may be constructed by software in a single server device by means of certain programs run by the CPU. The data intermediate server may also be constructed by software in the single server device by means of certain programs run by the CPU. These structures will allow systems to be built at lower cost because the computer system architecture can be simplified.

In such a structure, the server device keeps reception buffer areas for the storage servers and data intermediate server to use in exchanging data, in the memory of the server device, and the storage servers and data intermediate server use the reception buffer areas as backup channels.

This sort of structure can prevent unauthorized intrusions or the like that use Internet protocols, because the data itself can be exchanged through the reception buffer. Data can also be efficiently transmitted because there is no need for a process to divide the data into packets or to attach protocol headers, as in data transmission based on communications protocols.

Here, the server device may control the allocation of physical devices for the server device used by the data intermediate server and storage servers constructed by software, based on certain resource allocation tables.

The physical device can include, for example, at least any one of a CPU, memory, magnetic disk, and network interface, and the resource allocation tables can define at least any one of appropriable CPU utilization, appropriable memory area, appropriable disk area, and usable network interface for each storage device and data intermediate server.

Such resource allocation tables can be used to allow the functions of the storage servers and the functions of the data intermediate server to be efficiently realized by software by means of one server device.

In computer systems with the various structures described above, the backup device may store lists in which the locations of data targeted for backup are registered, and may send backup commands to the data intermediate server based on the lists.

For example, locations of data targeted for backup may be registered in the lists by means of a directory structure comprising identification paths for individually identifying the storage servers and paths specific to the storage servers, and the data intermediate server can specify the storage server in which the data targeted for backup is stored, and can read the stored data from the storage server to the specific path.

Such a structure allows identifiers for specifying the storage server targeted for backup and the locations of data stored in the storage servers to be registered in the lists in a uniform format, thus allowing the locations of the data targeted for backup to be efficiently managed.

In computer systems with the various structures described above, the storage servers may store start paths that serve as the basis of where data targeted for backup will be stored, specify data indicated by the data intermediate server, and output the specified data to the data intermediate server. Such a structure will make it possible to set a range of data which is backed up by the storage device as well as the backup device.

In a computer system with such a structure, the storage servers may comprise means for modifying the details in the start paths by means of a computer connected over the Internet. This will allow clients more flexibility to set the range of data to be backed up using a storage server over the Internet.

In computer systems with the various structures described above, the backup device may comprise a media server for outputting the data to certain recording media, and a backup control device for storing the data to the media server for secondary backup.

In this sort of structure, the backup control device can establish a data socket to the media server before sending the backup command to the data intermediate server, and can establish a connection between the media server and data intermediate server.

Here, the recording media to which the backup device backs up the data can be tape media. Because tape media generally has a greater storage capacity than magnetic disks or the like, more data can be backed up.

The storage servers, backup device, and data intermediate server may also be located in the same data center.

In addition to the various computer system structures described above, the present invention can also be worked in the form of an invention of the following method, specifically, a method for backing up comprising;

providing the computer system with storage servers that are accessed over the Internet and that are individually prepared for predetermined sections, a backup device for backing up data stored in the storage servers, and a data intermediate server connected to the storage servers and backup device, wherein receiving backup commands sent from the backup device by the data intermediate server, reading data from the storage servers, according to the backup commands that the data intermediate server received, through channels where data is exchanged based on a communication procedure that is different from the protocol used in the Internet, and sending the read data to the backup device, and storing the data by the backup device.

In this type of backup method, during the backup of data stored on the storage servers, client data transmitted between the data intermediate server and backup device can be prevented from leaking or being improperly accessed by other clients, and the data can be properly backed up, in the same manner as the computer system described above.

In addition to the embodiments of computers systems and back up methods described above, the present invention can also be worked in the form of computer programs for allowing a computer to run data back up. Such computer programs may also be embodied in the form of data signals in carrier waves, and may be recorded on computer-readable recording media. Examples of recording media include CD-ROMs, floppy disks, opticomagnetic disks, and DVDs.

BRIEF DESCRIPTION OF THE DRAWINGS

FIG. 3 illustrates and example of a resource allocation table TB1.

FIG. 5 illustrates an example of a storage server table TB2.

FIG. 8 illustrates an example of a file list FL.

DESCRIPTION OF THE PREFERRED EMBODIMENTS

Embodiments of the invention are given in the following order to further elucidate the operation and effects of the above inventions.

Figure 1:
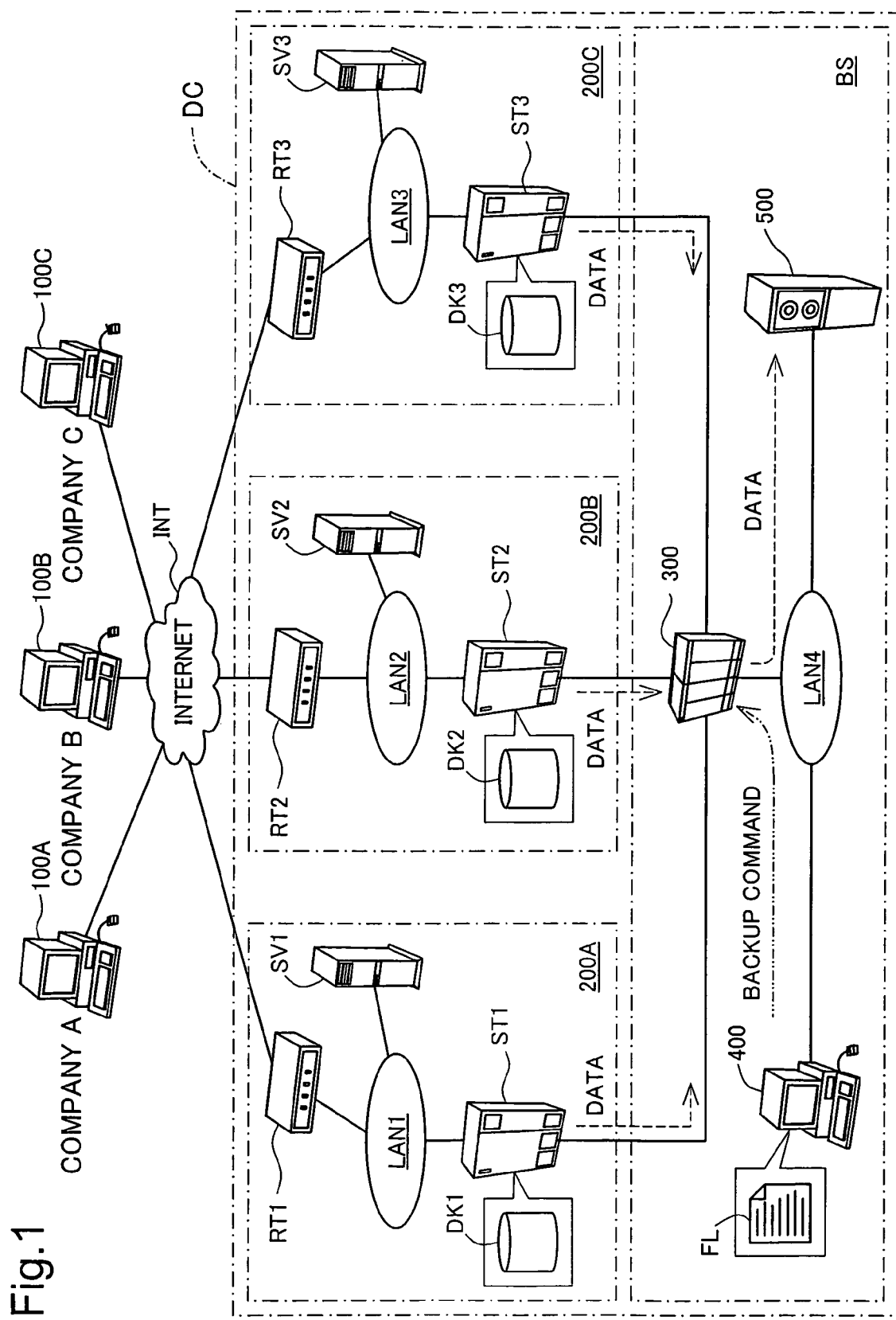
FIG. 1 illustrates the basic structure in an embodiment of the invention.

A. Embodiments
B. First Embodiment
(B1) System Structure as a Whole
(B2) Backup Process
(B3) Effects
C. Second Embodiment
D. Variants A. Embodiments FIG. 1 illustrates the basic structure in an embodiment of the invention. As illustrated, the computer system in this embodiment comprises a data center DC, and client computers connected over the Internet INT to the data center DC. In this embodiment, a computer 100A of company A, a computer 100B of company B, and a computer 100C of company C are connected to the data center DC. The data center DC is equipped with a system 200A for company A, system 200B for company B, and system 200C for company C, corresponding to each client, and is also equipped with a backup system BS for backing up data in these systems. Although there are three clients in this embodiment, the number is not limited.

The system 200A for company A is constructed by connecting a router RT1, web server SV1, and storage server ST1 to each other by a local area network LAN1. The computer 100A of company A is connected over the Internet INT to the router RT1. The storage server ST1 is constructed in the form of an NAS (Network Attached Storage) comprising a disk device DK1, and HTML (Hyper Text Markup Language) data or the like used by the web server SV1 is stored in the disk device DK1.

Meanwhile, the system 200B for company B is constructed by connecting a router RT2, web server SV2, and storage server ST2 to each other by a local area network LAN2. The computer 100B of company B is connected over the Internet INT to the router RT2. The storage server ST2 is constructed in the form of an NAS comprising a disk device DK2, and a data base or the like used by the web server SV2 is stored in the disk device DK2.

The system 200C for company C is also constructed by connecting a router RT3, FTP server SV3, and storage server ST3 to each other by a local area network LAN3. The computer 100C of company C is connected over the Internet INT to the router RT3. The storage server ST3 is also constructed in the form of an NAS comprising a disk device DK3, and various types of data available in file transmission by the FTP server SV3 is stored in the disk device DK3.

The backup system BS is constructed by connecting a data intermediate server 300, backup control device 400, and media server 500 to each other by means of a local area network LAN4. The above storage servers ST1 through ST3 are also each connected by backup channels BK1 through BK3 to the data intermediate server 300.

The backup control device 400 is a device for comprehensively controlling file backup carried out between the storage servers ST1 through ST3, data intermediate server 300, and media server 500. The backup control device 400 stores a file list FL in which the locations of files targeted for backup have been registered by the system administrator, and controls file backup based on this file list FL. The back up control device 400 can make use of NDMP (Network Data Management Protocol), for example, which works on an Internet protocol as the protocol for backing up files.

The backup control device 400 is a device which, based on backup commands from the data intermediate server 300, reads files stored in the storage servers ST1 through ST3 and transmits the files through the local area network LAN4 to the media server 500.

The media server 500 is a device for recording data transmitted from the data intermediate server 300 through the local area network LAN4 to tape media.

In the computer system in this embodiment, the Internet Protocol (IP) is used as the communication protocol for communication between devices via the local area networks LAN1 through LAN4 or the Internet INT. However, the data intermediate server 300 and the storage servers ST1 through ST3 are connected by the backup channels BK1 through BK3, which do not permit Internet protocol traffic but only data targeted for backup and control data assigned thereto. A specific example of such backup channels BK1 through BK3 is illustrated in an embodiment below.

According to the embodiment with this structure, access by the Internet Protocol from the Internet INT side to the local area network LAN4 side is limited, making it possible to prevent unauthorized retrieval of backup data circulating in the backup system BS. Several embodiments in which the present embodiment is applied are described below.

B. First Embodiment (B1) System Structure as a Whole

Figure 2:
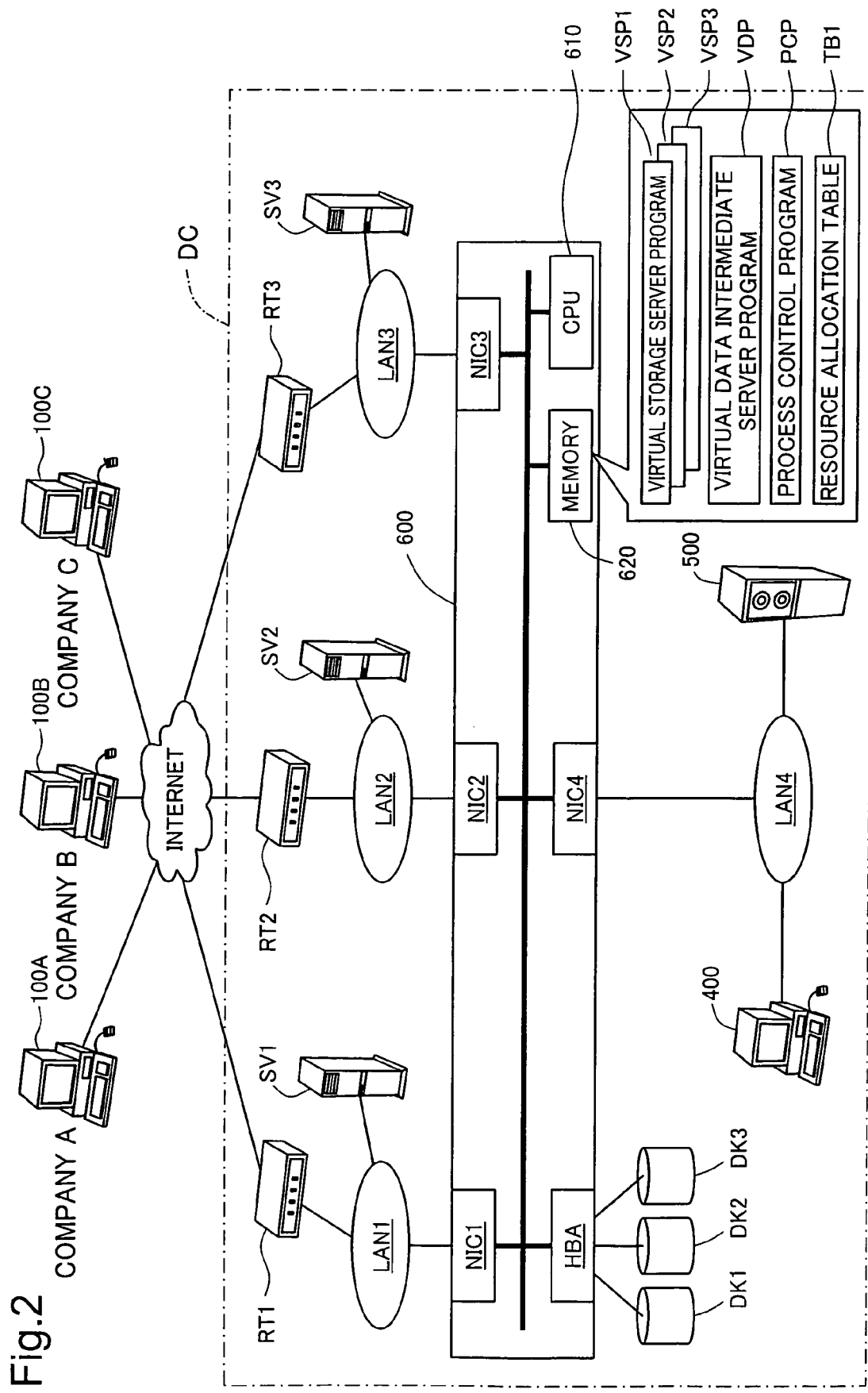
FIG. 2 illustrates the structure of the system as a whole in a first embodiment.

FIG. 2 illustrates the structure of the system as a whole in a first embodiment. In this embodiment, the functions of the storage servers ST1 through ST3 and the functions of the data intermediate server 300 among the above embodiments are realized by software in one server device. Such a server device is referred to as the data server 600 in the following description.

As illustrated, the data server 600 is composed in the form of a computer comprising a CPU 610, memory 620, network interfaces NIC1 through NIC4, a host bus adapter HBA, and the like. The local area networks LAN1 through LAN4 are each connected to the network interfaces NIC1 through NIC4. Three disk devices DK1 through DK3 are meanwhile connected to the host bus adapter HBA.

A process control program PCP, a resource allocation table TB1 used by the process control program PCP, a virtual data intermediate server program VDP, and virtual storage server programs VSP1 through VSP3 which are run by the CPU 610 are stored in memory 620. These programs may also be installed on any of the disk devices DK1 through DK3, in which case they are read from the physical disk to memory 620 and run by the CPU 610.

The virtual storage server programs VSP1 through VSP3 are programs for executing the functions of the storage servers ST1 through ST3 in the above embodiments. The virtual data intermediate server program VDP is a program for executing the functions of the data intermediate server 300 in the above embodiment.

The process control program PCP is a program for allocating specific resources to processes produced when the above programs are run, and for controlling the process operations. Resources are allocated with reference to the resource allocation table TB1.

FIG. 3 illustrates an example of a resource allocation table TB1. As illustrated, usable memory space or disk areas, network interfaces, maximum occupiable CPU utilization, and the like are established in the resource allocation table TB1. A reception buffer memory area is also established for the exchange of data between the virtual storage server programs VSP1 through VSP3 and the virtual data intermediate server program VDP. In this embodiment, as illustrated, paths where the magnetic disks DK1 through DK3 are mounted (such as "/mnt/dk1/") are assigned as disk areas allocated for each process. In contrast, however, ranges of physical addresses in the magnetic disks may be allocated, and virtual drives kept in the magnetic disks may be individually allocated. Optional directories or partitions may also be allocated.

Figure 4:
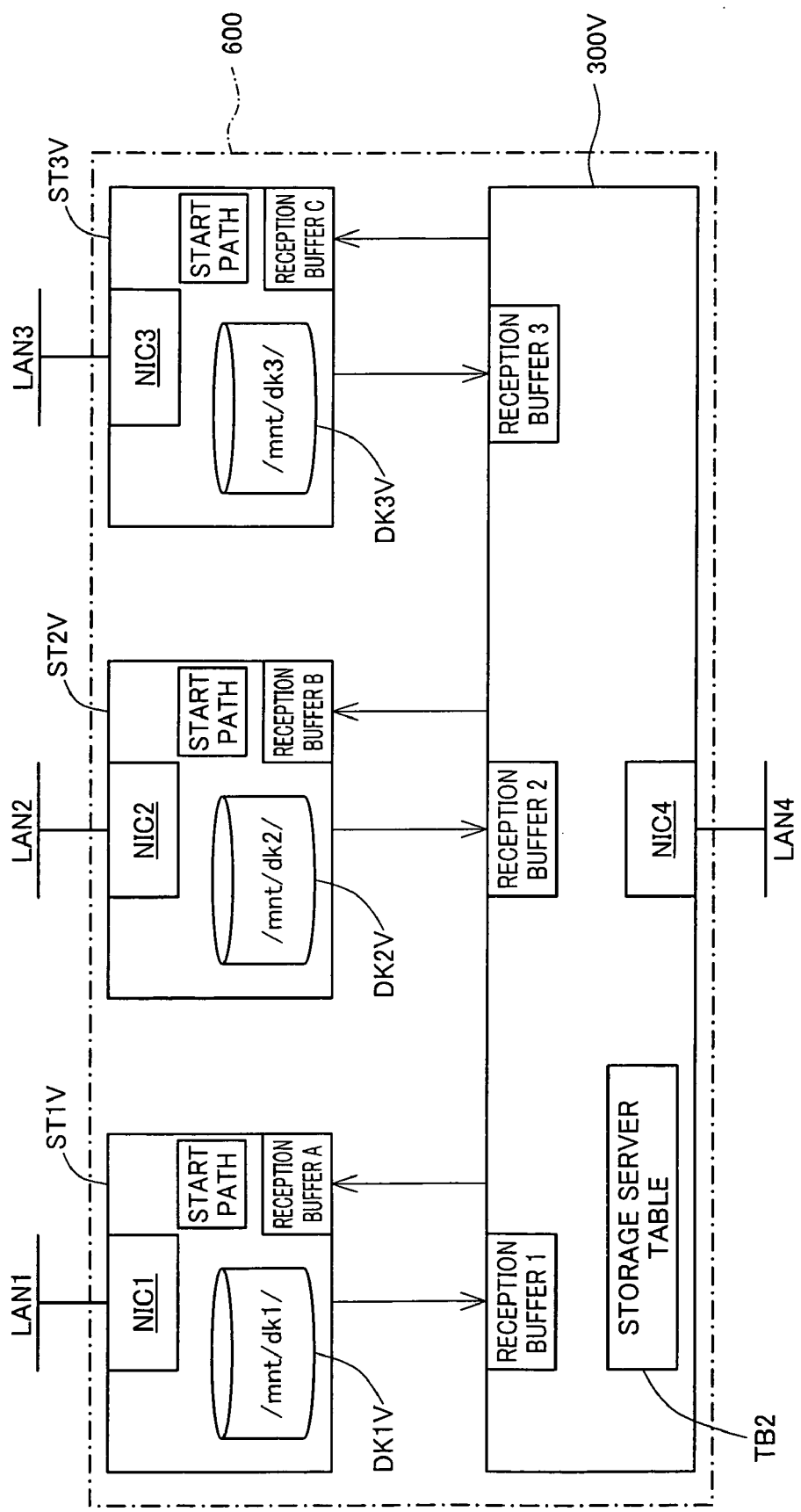
FIG. 4 illustrates the theoretical structure of the data server 600.

FIG. 4 illustrates the theoretical structure of the data server 600 realized by running the various programs described above. As illustrated, the virtual storage server program VSP1 is run so that the virtual storage server ST1V for company A is constructed by software in the data server 600. Similarly, the virtual storage server program VSP2 is run so that the virtual storage server ST2V for company B is constructed, and the virtual storage server program VSP3 is run so that the virtual storage server ST3V for company C is constructed.

The virtual data intermediate server program VDP is also run so that the virtual data intermediate server 300V is constructed by software.

As illustrated, the individual network interfaces NIC1 through NIC3, disk areas DK1V through DK3V, or reception buffers A through C are allocated to the virtual storage servers ST1V through ST3V based on the resource allocation table TB1. The virtual storage servers ST1V through ST3V also store a "start path" in the memory space or disk area allocated to each. Paths that serve as the basis of where data targeted for backup will be stored are established in the start paths.

The network interface NIC4 is allocated to the virtual data intermediate server 300 based on the resource allocation table TB1, and the individual reception buffers 1 through 3 are also allocated to the virtual storage servers ST1V through ST3V. The virtual data intermediate server 300V stores a storage server table TB2 to manage the virtual storage servers ST1V through ST3V in the memory space or disk area allocated based on the resource allocation table TB1.

FIG. 5 illustrates an example of a storage server table TB2. As illustrated, the corresponding relations between "identification paths," "storage paths names," and "interfaces" are defined in the storage server table TB2. "Identification paths" are identifiers which are used when the backup control device 400 indicates a virtual storage server targeted for backup in the backup process described below. "Storage server names" are names given individually to the virtual storage servers ST1V through ST3V. In this embodiment, the virtual storage server ST1V is designated "vnas1," the virtual storage server ST2V is designated "vnas2," and the virtual storage server ST3V is designated "vnas3." Reception buffers used by the virtual storage servers ST1V through ST3V during the exchange of data with the virtual data intermediate server 300V are indicated in the "interfaces."

As noted above, in this embodiment, the storage servers ST1 through ST3 and data intermediate server 300 in FIG. 1 are constructed by software in one data server 600, and the virtual backup channels VBK1 through VBK3 in FIG. 4 are thus also realized virtually by the exchange of data using the data given in the table in FIG. 5. The storage servers and data intermediate server can also be individually established, and can be connected by actual channels using a protocol other than the Internet Protocol.

(B2) Backup Process

Figure 6:
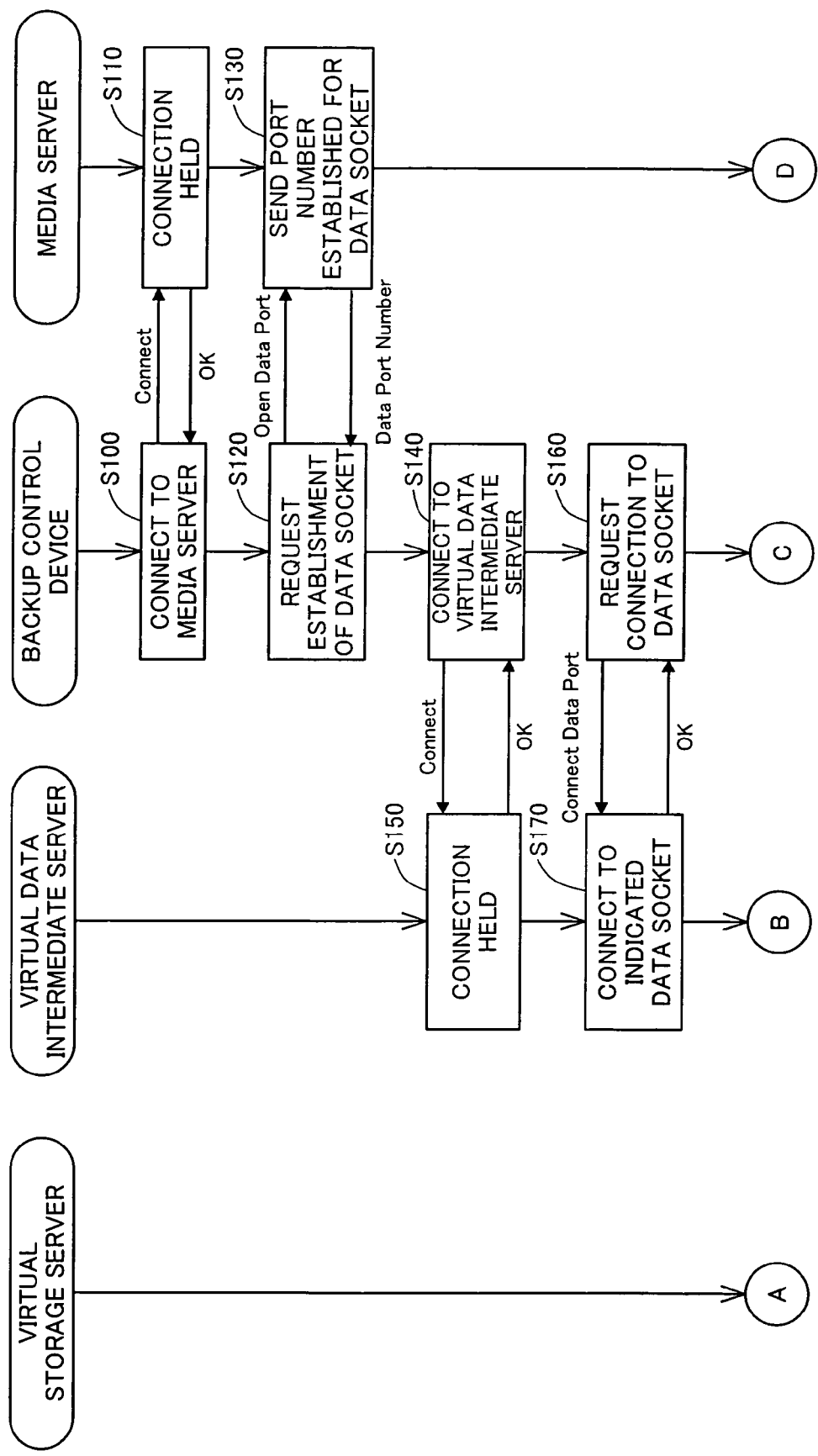
FIG. 6 is a flow chart of the backup process.
Figure 7:
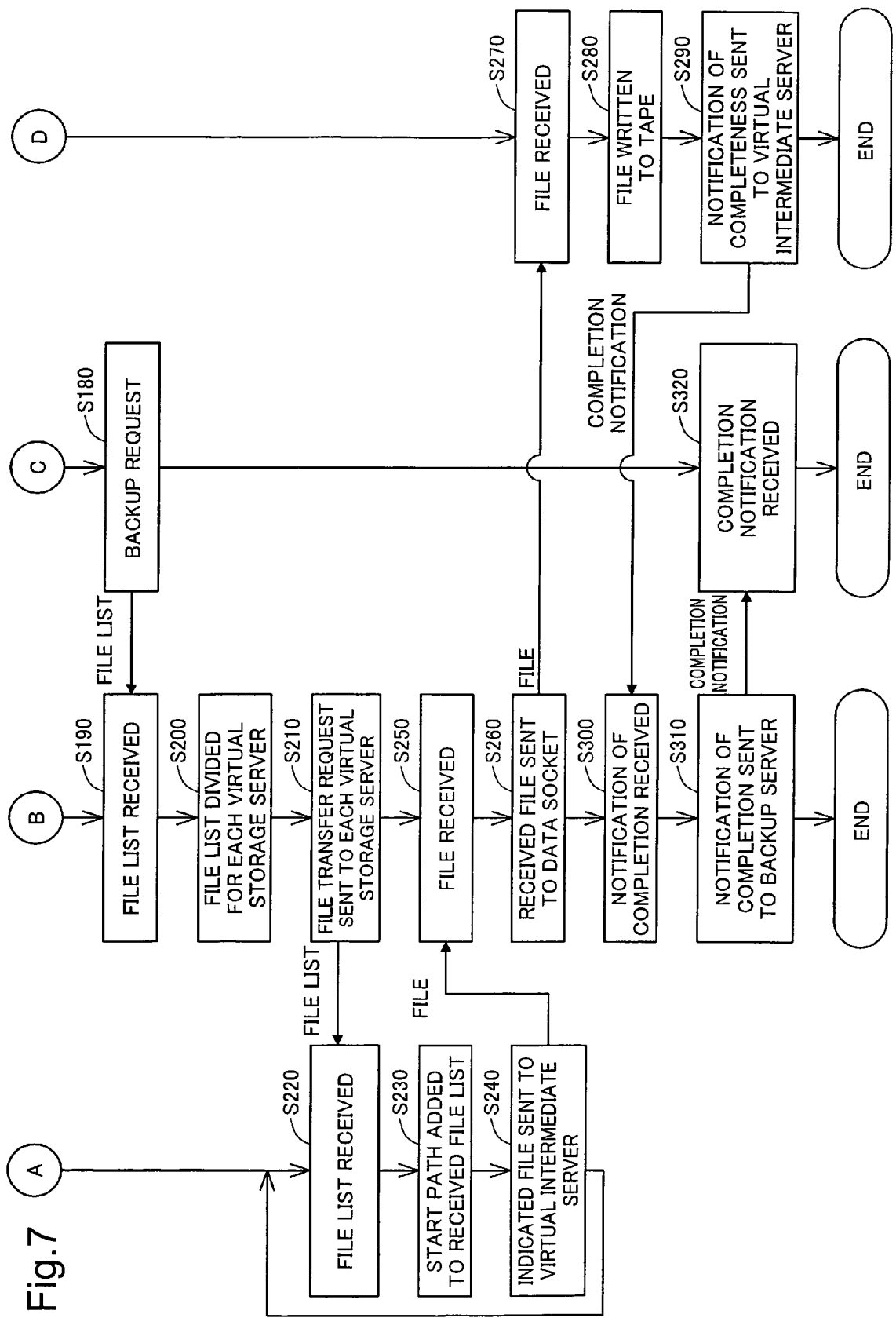
FIG. 7 is a flow chart of the backup process.

FIGS. 6 and 7 are flow charts of a backup process carried out between the virtual storage servers ST1V through ST3V, virtual data intermediate server 300V, backup control device 400, and media server 500. The backup process starts when the system administrator carries out back up operations in regard to the backup control device 400.

When the backup process is executed, the backup control device 400 first requests a connection to the media server 500 through the local area network LAN4 (step S100: "Connect"). The media server 500 replies that a connection is possible ("OK") upon receiving the request while connected (step S110).

Upon receiving the notification from the media server 500 that connection is possible, the backup control device 400 requests the establishment of a data socket to the media server 500 (step S120: "Open Data Port"). the media server 500 establishes the data socket upon receiving the command, and ends the port number of the established data socket (step S130: "Data Port Number").

Upon receiving the port number from the media server 500, the backup control device 400 requests a connection to the virtual data intermediate server 300V through the local area network LAN4 (step S140: "Connect"). Upon receiving the request while connected, the virtual data intermediate server 300V responds that a connection is possible ("OK") (step S150).

Upon receiving the response that a connection is possible from the virtual data intermediate server 300V, the backup control device 400 sends the port number given by the media server 500 in step S130 to the virtual data intermediate server 300V, and requests connection to the data socket corresponding to the port number (step S160: "Connect Data Port").

Upon receiving the request, the virtual data intermediate server 300 connects to the data socket established by the media server 500. When the connection to the data socket is complete, a reply that the connection is complete ("OK") is sent to the backup control device 400 (step S170).

In the above process, a connection is established between the virtual data intermediate server 300V and the media server 500 through the local area network LAN4. Data can thus be sent from the virtual data intermediate server 300V to the media server 500 through the local area network LAN4.

With reference to FIG. 7, when the above process results in the establishment of a connection between the virtual data intermediate server 300V and the media server 500, the backup control device 400 sends a backup request through the local area network LAN4 to the virtual data intermediate server 300V (step S180). At that time, the backup control device 400 sends the file list in which the list of files targeted for backup are registered, along with the backup request, to the virtual data intermediate server 300V.

FIG. 8 illustrates an example of a file list FL. As illustrated, the files targeted for backup are registered by means of a directory structure in the file list FL. For example, "/vnas1/secret.txt" is the first registered file in the list targeted for backup in the illustrated list. This indicates that "vnas1," that is, a file referred to as "secret.txt" stored on the virtual storage server ST1V, is targeted for backup. Also, for example, "/vnas3/log/*" is indicated sixth in the list. This indicates that "vnas3," that is, all the files stored in a directory referred to as "log on the virtual storage server ST3V, are targeted for backup.

With reference to FIG. 7 again, upon receiving the backup command and the file list F from the backup control device 400 (step S190), the virtual data intermediate server 300V matches the identification path sections in the file list FL with the identification paths in the storage server table TB2, and divides the file list FL that has been received into file lists for the virtual storage servers ST1V through ST3V (step S200). For example, when the file list FL includes an identification path "/vnas1," the list is divided as a file list for vnas1.

Figure 9A:
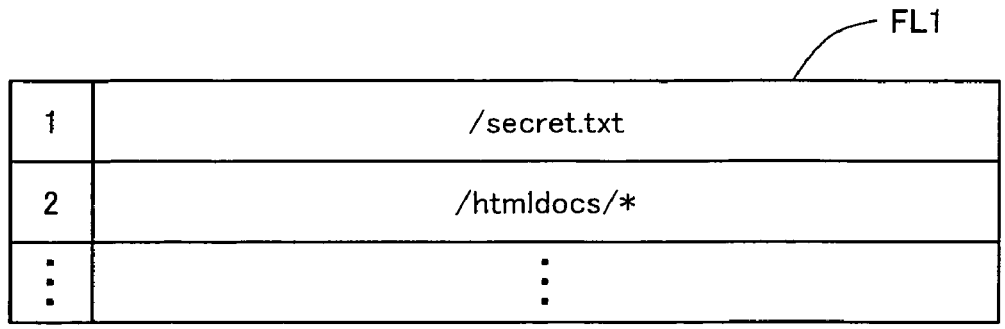
FIGS. 9a through 9c illustrate file lists after allocation.
Figure 9B:
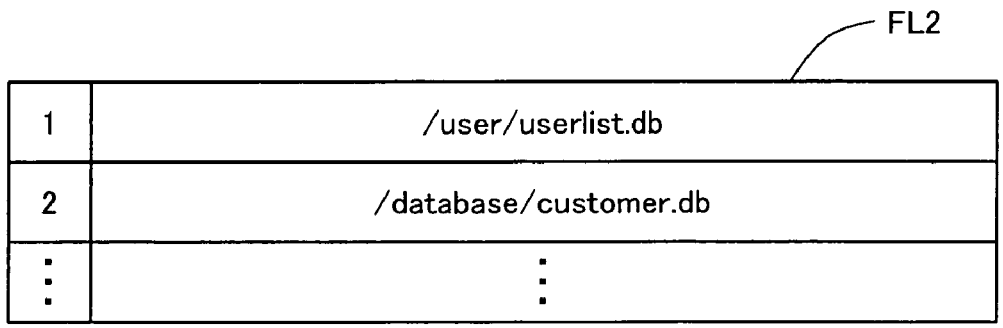
Figure 9C:
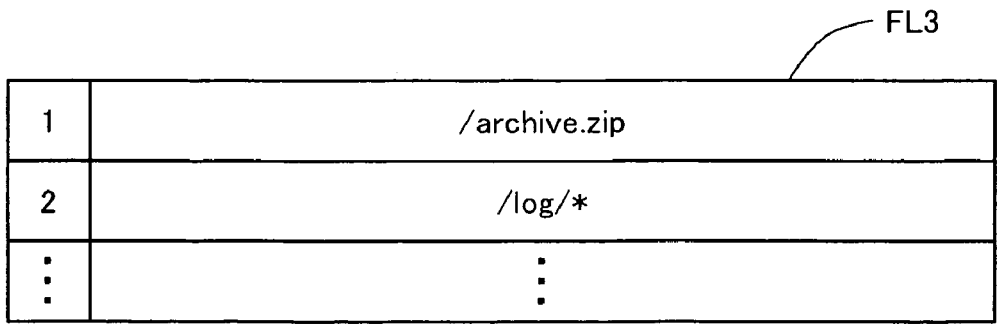

FIGS. 9a through 9c illustrate examples in which the file list FL in FIG. 8 has been divided. FIG. 9a shows a file list FL1 for vnas1, and FIG. 9b shows a file list FL2 for vnas2. FIG. 9c shows a file list FL3 for vnas3. As illustrated, the virtual data intermediate server 300 deletes a portion of the identification path referred to as "/vnas1" or "/vnas2" from the file lists FL1 through FL3 when dividing the file list FL.

With reference to FIG. 7 again, when the virtual data intermediate server 300V divides the file list FL, the file lists FL1 through FL3 are sent to the virtual storage servers ST1V through ST3V (vnas1 through vnas3), and a file transfer is requested (step S210). The file transfer request is sent through the interfaces (see FIG. 5) established in the storage server table TB2. That is, in this embodiment, the request is sent through the reception buffers a through c allocated to the virtual storage servers and the reception buffers 12 through 3 allocated to the virtual data intermediate server 300V.

Upon receipt of the file lists and file list transfer requests from the virtual data intermediate server 300V through the reception buffers (step S220), the virtual storage servers ST1V through ST3V add the "start paths" in FIG. 4 to the file lists (step S230). When, for example, a path "/usr/local/" is established in the "start path" and a file "database/customer.db" is registered in the file list, the file list after the addition of the start path would be "/usr/local/database/customer.db." When no "start path" is established on the virtual storage server, the process in step S230 is skipped.

When the virtual storage servers ST1V through ST3V add start paths to the file lists, the files corresponding to the files registered in the file lists are retrieved from the respective disk areas and sent to the virtual data intermediate server 300V (step S240). the files are transmitted through the reception buffers in the same manner as in step S210.

Upon receipt of the files from the virtual storage servers ST1V through ST3V through the reception buffers (step S250), the virtual data intermediate sever 300V sends the received files to the data socket of the media server 500 where a connection was established in step S170 above (step S260). The files are transferred through the local area network LAN4.

Upon receipt of the files from the virtual data intermediate server 300V (step S270), the media server 500 writes all the received files to the tape media (step S280). When the writing is finished, the virtual data intermediate server 300V is notified through the local area network LAN4 that the writing is complete (step S290).

Upon receiving notification from the media server 500 that the writing is complete (step S300), the virtual data intermediate server 300 notifies the backup control device 400 through the local area network LAN4 that backup is complete (step S310). When the backup control device 400 receives notification that backup is complete (step S320), the backup process is complete.

(B3) Effects

In the computer system of the embodiment described above, the exchange of data between the virtual storage servers ST1V through ST3V and the virtual data intermediate server 300V is managed through the reception buffers established in the memory 620 of the data server 600. Although the Internet Protocol is used as the communication protocol on the local area networks LAN1 through LAN3 and Internet INT, this type of communication protocol is not used in the reception buffers, and the data itself is handled directly, thus limiting direct access to the local area network LAN4 constructed on the backup system BS side from the web server SV1 or client computers 100A through 100C connected over the Internet INT. Thus, during the backup of the above files, client files transmitted over the local area network LAN4 can be prevented from leaking or being improperly accessed by other client computers, and the data can be properly backed up.

In this embodiment, the functions of the storage servers ST1 through ST3 and the functions of the data intermediate server 300 are realized by software by means of one data server 600, allowing the system to be constructed at a lower cost.

C. Second Embodiment

Figure 10:
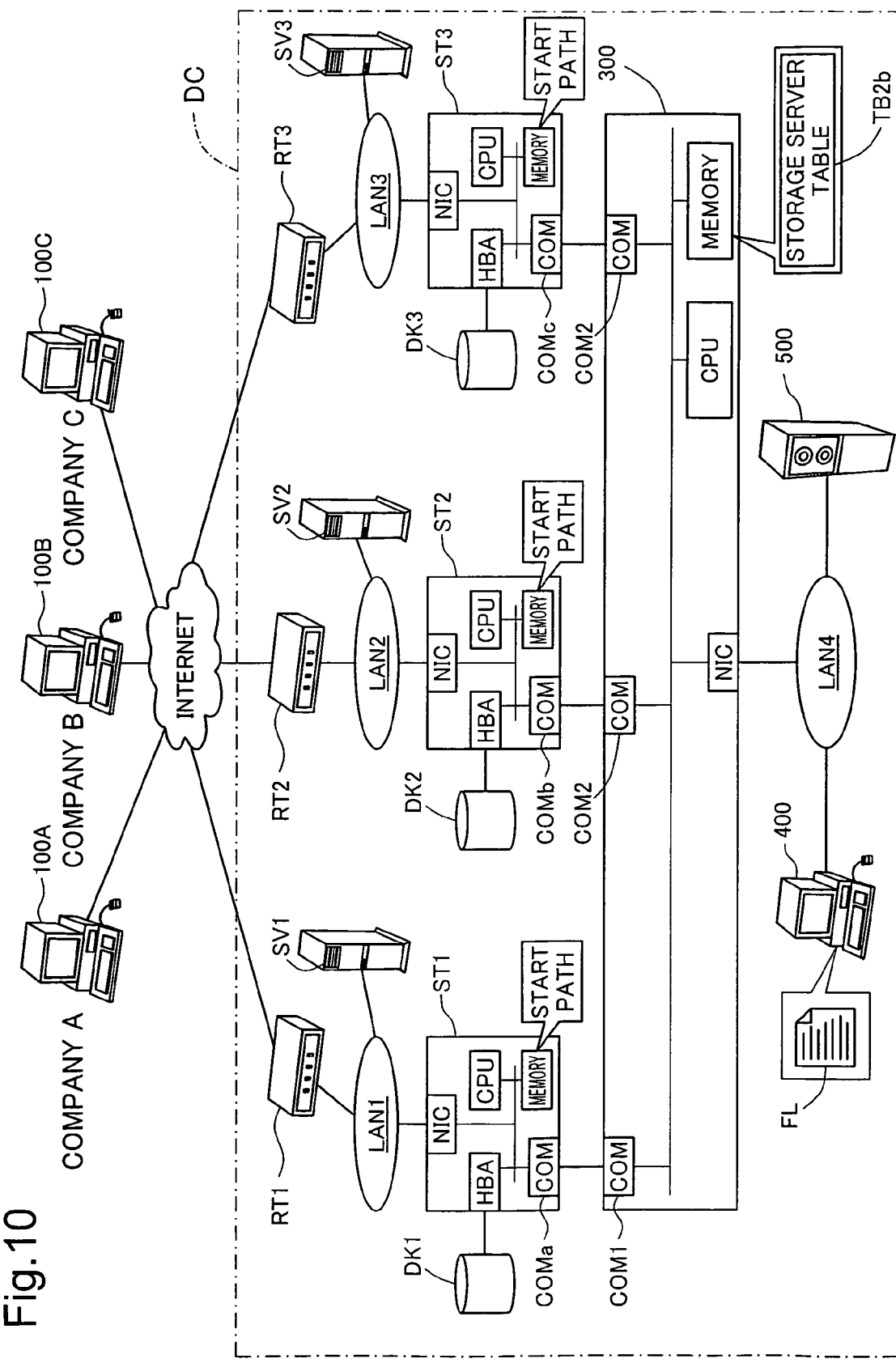
FIG. 10 illustrates the structure of the system as a whole in a second embodiment.

FIG. 10 illustrates the structure of the system as a whole in a second embodiment. In the first embodiment, the functions of the storage servers ST1 through ST3 and the functions of the data intermediate server 300 were realized by software by means of one data server 600, but in this embodiment, the storage servers ST1 through ST3 and the data intermediate server 300 are separate devices in the same manner as the basic structure in the embodiment.

The storage servers ST1 through ST3 each comprise a CPU, memory, network interface NIC, host bus adapter HBA, communication port COM, and the like. The network interfaces NIC of the storage servers ST1 through ST3 are connected to local area networks LAN1 through LAN3, and the host bus adapters HBA are connected to the disk devices DK1 through DK3. Start paths are also stored in memory.

the data intermediate server 300 comprises a CPU, memory, network interface NIC for connection to the local area network LAN4, and three communication ports COM. The storage server table TB2b is stored in memory.

Figure 11:
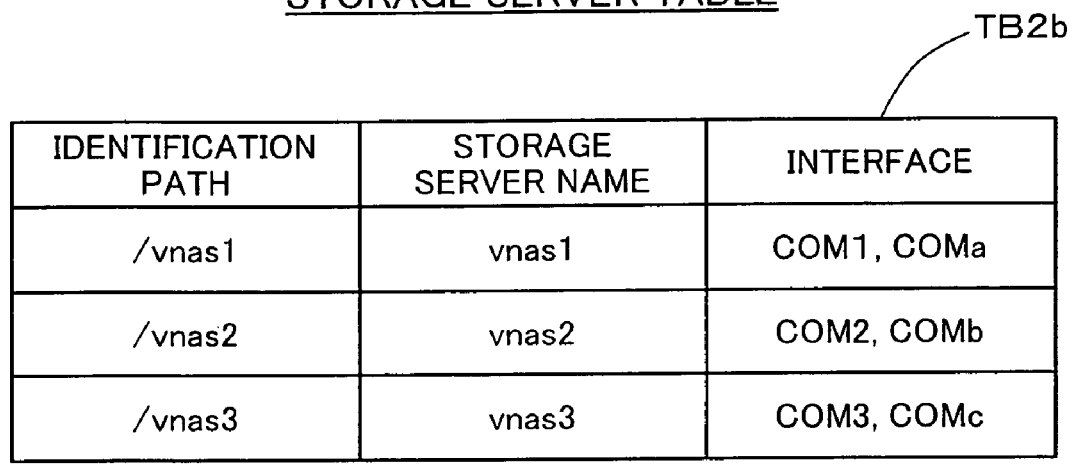
FIG. 11 illustrates an example of a storage server table TB2b.

FIG. 11 illustrates an example of a storage server table TB2b. As illustrated, the contents of the storage server table TB2b are virtually the same as those in the storage server table TB2 in FIG. 5 of the first embodiment, but the "interface" details are different. That is, reception buffers were used s interfaces in the transfer of data in the first embodiment, but communication ports COM are used in this embodiment.

IEEE1394 ports are used as the communication ports COM in this embodiment. In IEEE1394 ports, data is transferred based on the IEEE1394 protocol, not the Internet Protocol. Other examples of communication ports include bidirectional serial ports such as RS-232C, and USB ports, Infiniband, fiber channels, and the like. When only protocols that are not compatible with Internet protocols, such as IPX/SPX or NetBEUI, for example, are used, then Ethernet (registered trademark) ports can be used as the communication ports COM.

In the computer system of this embodiment constructed in the manner described above, the backup process is the same as that described using FIGS. 6 and 7 in the first embodiment. However, the process carried out by the virtual storage servers ST1V through ST3V in FIGS. 6 and 7 are carried out by the storage servers ST1 through ST3 in FIG. 10, and the process carried out by the virtual data intermediate server 300V in FIGS. 6 and 7 is carried out by the data intermediate server 300 in FIG. 10.

In the backup process, the process of sending the file transfer requests and the file lists shown in step S210 of FIG. 7 is carried out through the communication ports COM in the present embodiment. The file transmission process in step S240 is similarly carried out through the communication ports COM.

In the second embodiment constructed in the above manner, the exchange of data between the storage servers ST1 through ST3 and the data intermediate server 300 is carried out through the communication ports COM based on the IEEE1394 protocol. The Internet Protocol is used as the communication protocol on the local area networks LAN1 through LAN3 or the Internet INT, but the Internet Protocol is not used in communications through the communication ports COM, thus limiting direct access to the local area network LAN4 constructed on the backup system BS side from the web server SV1 or client computers 100A through 100C connected over the Internet INT. Client files transmitted over the local area network LAN4 during the file backup process can thus be prevented from leaking or being improperly accessed by other client computers, and the data can be properly backed up.

D. Variants

A few embodiments of the invention were described above, but the invention can be worked in a variety of forms without departing from the spirit and scope of the invention. The following variants are possible, for example.

In the above embodiments, reception buffers or communication ports COM were used to block Internet Protocol traffic and to limit access from client computers 100A through 100C and the like to the backup system BS in the data center DC. By contrast, in structures where, for example, the storage servers ST1 through ST3 and the data intermediate server 300 are connected by the Ethernet (registered trademark), the data intermediate server 300 can monitor all packets transmitted from the storage servers ST1 through ST3 so as to permit only data corresponding to file transfer requests from the backup control device 400. In such cases, the data intermediate server 300 cancels all packets spontaneously sent from the storage servers ST1 through ST3 or client computers 100A through 100C. This form of control can control access from the storage servers ST1 through ST3 or Internet INT to the backup system BS side even though the data transferred between the storage servers ST1 through ST3 and the data intermediate server 300 are based on the Internet Protocol.

In the above embodiments, "start paths" stored in the storage servers ST1 through ST3 and virtual storage servers VST1 through VST3 may optionally be established from the client computers 100A through 100C. A method of establishment, for example, is to have the client computers 100A through 100C read the start paths from the respective storage servers over the Internet INT, and to edit the contents of the start paths using a text editor or the like installed on the client computers 100A through 100C. Optional start paths can also be established by being written back to the respective storage servers. When the start paths can be edited in this manner, the client has more flexibility in establishing ranges targeted for backup.

Data may also be transferred between the storage servers and data intermediate server using a unique protocol instead of an existing protocol. The backup communications channels can also be uniquely constructed.

Having described a preferred embodiment of the invention with reference to the accompanying drawings, it is to be understood that the invention is not limited to the embodiments, and that various changes and modifications could be effected therein by one skilled in the art without departing from the spirit or scope of the invention as defined in the appended claims.

What is claimed is:

1. A computer system, comprising:
   a data server coupled to a plurality of client computers via an Internet, and comprising a CPU, a memory and a plurality of network interfaces, the CPU executing a virtual data intermediate server and a plurality of virtual storage servers, the memory storing a storage server information including a plurality of first identification path information, each of the plurality of first identification path information identifying one of the plurality of virtual storage servers; and
   a backup server coupled to the data server via a local area network and sending a backup request and a first file list to the virtual data intermediate server, the first file list including a set of a plurality of file information, each of the plurality of file information including both a second identification path information for identifying one of the plurality of virtual storage servers and a file reference identification used for referring to a file,
   wherein the virtual data intermediate server receives the backup request and the first file list from the backup server, and compares a plurality of the second identification path information in the first file list to the plurality of first identification path information included in the storage server information,
   wherein the virtual data intermediate server, if each of the plurality of second identification path information in the first file list corresponds to one of the plurality of first identification path information included in the storage server information, divides the first file list to a plurality of second file lists, each of the plurality of second file lists including one of the plurality of file reference identifications,
   wherein the virtual data intermediate server transfers a plurality of file transfer request and the plurality second file lists to the plurality of virtual storage servers, each of the plurality of second file lists being transferred to one of the plurality of virtual storage servers, which is identified by one of the plurality of second identification path information in the first file list,
   wherein each of the plurality of virtual storage servers receives one of the plurality of file transfer request and a corresponding one of the plurality of second file lists, and sends a file, identified by one of the plurality of file reference identifications included in the corresponding one of the plurality of second file lists, to the virtual data intermediate server in response to the one of the plurality of file transfer request and the corresponding one of the plurality of second file lists, and
   wherein the virtual data intermediate server receives a plurality of files from the plurality of virtual storage servers and sends a set of the plurality of files to the backup server so that the backup server can backup the set of the plurality of files which the backup server request to the virtual data intermediate server by the backup request and the first file list.

2. The computer system in accordance with claim 1, wherein each of the plurality of virtual storage servers stores a start path including a path as the basis of a location storing the file, identified by the one of the plurality of file reference identifications included in the corresponding one of the plurality of second file lists.

3. The computer system in accordance with claim 2, wherein each of the plurality of virtual storage servers adds a start path to the corresponding one of the plurality of second file lists 4. The computer system in accordance with claim 1,
   wherein each of the plurality of virtual storage servers retrieves data of the file, identified by the one of the plurality of file reference identifications included in the corresponding one of the plurality of second file lists, from an area of a plurality of disk devices in the data server, and
   wherein the area of the plurality of disk devices is assigned to one of the plurality of virtual storage servers.

5. The computer system in accordance with claim 1, wherein each of the plurality of virtual storage servers is assigned to an area of a buffer memory in the data server for exchange data of the file, identified by the one of the plurality of file reference identifications included in the corresponding one of the plurality of second file lists.

6. A data server coupled to a plurality of client computers via an Internet and to a backup server via a local area network, the data server comprising:
   a CPU executing a virtual data intermediate server and a plurality of virtual storage servers;
   a memory storing a storage server information including a plurality of first identification path information, each of the plurality of first identification path information identifying one of the plurality of virtual storage servers; and
   a plurality of network interfaces coupled to the Internet and the local area network, wherein the virtual data intermediate server receives a backup request and a first file list from the backup server, the first file list including a set of a plurality of file information, each of the plurality of file information including both a second identification path information for identifying one of the plurality of virtual storage servers and a file reference identification used for referring to a file, wherein the virtual data intermediate server compares a plurality of the second identification path information in the first file list to the plurality of first identification path information included in the storage server information, wherein the virtual data intermediate server, if each of the plurality of second identification path information in the first file list corresponds to one of the plurality of first identification path information included in the storage server information, divides the first file list to a plurality of second file lists, each of the plurality of second file lists including one of the plurality of file reference identifications, wherein the virtual data intermediate server transfers a plurality of file transfer request and the plurality second file lists to the plurality of virtual storage servers, each of the plurality of second file lists being transferred to one of the plurality of virtual storage servers, which is identified by one of the plurality of second identification path information in the first file list, wherein each of the plurality of virtual storage servers receives one of the plurality of file transfer request and a corresponding one of the plurality of second file lists, and sends a file, identified by one of the plurality of file reference identifications included in the corresponding one of the plurality of second file lists, to the virtual data intermediate server in response to the one of the plurality of file transfer request and the corresponding one of the plurality of second file lists, and wherein the virtual data intermediate server receives a plurality of files from the plurality of virtual storage servers and sends a set of the plurality of files to the backup server so that the backup server can backup the set of the plurality of files, which the backup server request to the virtual data intermediate server by the backup request and the first file list.

7. The data server in accordance with claim 6, wherein each of the plurality of virtual storage servers stores a start path including a path as the basis of a location storing the file, identified by the one of the plurality of file reference identifications included in the corresponding one of the plurality of second file lists.

8. The data server in accordance with claim 7, wherein each of the plurality of virtual storage servers adds the start path to the corresponding one of the plurality of second file lists.

9. The data server in accordance with claim 6, wherein each of the plurality of virtual storage servers retrieves data of the file, identified by the one of the plurality of file reference identifications included in the corresponding one of the plurality of second file lists, from an area of a plurality of disk devices in the data server, and wherein the area of the plurality of disk devices is assigned to one of the plurality of virtual storage servers.

10. The data server in accordance with claim 6, wherein each of the plurality of virtual storage servers is assigned to an area of a buffer memory in the data server for exchange data of the file, identified by the one of the plurality of file reference identifications included in the corresponding one of the plurality of second file lists, with the virtual data intermediate server.

11. A computer program product comprising:

a computer program implemented in a data server, the data server being coupled to a plurality of client computers via an Internet and to a backup server via a local area network; and a computer readable storage medium having the computer program tangibly embodied thereon, wherein the computer program causes the data server to perform steps of:

executing a virtual data intermediate server and a plurality of virtual storage servers;

storing a storage server information including a plurality of first identification path information, each of the plurality of first identification path information identifying one of the plurality of virtual storage servers;

receiving, by the virtual data intermediate server, a backup request and a first file list from the backup server, the first file list including a set of a plurality of file information, each of the plurality of file information including both a second identification path information for identifying one of the plurality of virtual storage servers and a file reference identification used for referring to a file;

comparing, by the virtual data intermediate server, a plurality of the second identification path information in the first file list to the plurality of first identification path information included in the storage server information;

dividing, by the virtual data intermediate server, if each of the plurality of second identification path information in the first file list corresponds to one of the plurality of first identification path information included in the storage server information, the first file list to a plurality of second file lists, each of the plurality of second file lists including one of the plurality of file reference identifications;

transferring, by the virtual data intermediate server, a plurality of file transfer request and the plurality second file lists to the plurality of virtual storage servers, each of the plurality of second file lists being transferred to one of the plurality of virtual storage servers, which is identified by one of the plurality of second identification path information in the first file list;

receiving, by each of the plurality of virtual storage servers, one of the plurality of file transfer request and a corresponding one of the plurality of second file lists, and for sending a file, identified by one of the plurality of file reference identifications included in the corresponding one of the plurality of second file lists, to the virtual data intermediate server in response to the one of the plurality of file transfer request and the corresponding one of the plurality of second file lists; and receiving, by the virtual data intermediate server, a plurality of files from the plurality of virtual storage servers and for sending a set of the plurality of files to the backup server so that the backup server can backup the set of the plurality of files, which the backup server request to the virtual data intermediate server by the backup request and the first file list.

12. The computer program product in accordance with claim 11, wherein the computer program causes the data server to further perform a step of:

storing, by each of the plurality of virtual storage servers, a start path including a path as the basis of a location storing the file, identified by the one of the plurality of file reference identifications included in the corresponding one of the plurality of second file lists.

13. The computer program product in accordance with claim 12, wherein the computer program causes the data server to further perform a step of:
adding, by each of the plurality of virtual storage servers, the start path to the corresponding one of the plurality of second file lists.

14. The computer program product in accordance with claim 11, wherein the computer program causes the data server to further perform a step of:
retrieving, by each of the plurality of virtual storage servers, data of the file, identified by the one of the plurality of file reference identifications included in the corresponding one of the plurality of second file lists, from an area of a plurality of disk devices in the data server,
wherein the area of the plurality of disk devices is assigned to one of the plurality of virtual storage servers.

15. The computer program product in accordance with claim 11, wherein the computer program causes the data server to further perform a step of
assigning each of the plurality of virtual storage servers to an area of a buffer memory in the data server for exchange data of the file, identified by the one of the plurality of file reference identifications included in the corresponding one of the plurality of second file lists, with the virtual data intermediate server.

16. A file control method in a data server, the data server being coupled to a plurality of client computers via an Internet and to a backup server via a local area network, the file control method comprising:
executing a virtual data intermediate server and a plurality of virtual storage servers;
storing a storage server information including a plurality of first identification path information, each of the plurality of first identification path information identifying one of the plurality of virtual storage servers;
receiving, by the virtual data intermediate server, a backup request and a first file list from the backup server, the first file list including a set of a plurality of file information, each of the plurality of file information including both a second identification path information for identifying one of the plurality of virtual storage servers and a file reference identification used for referring to a file;
comparing, by the virtual data intermediate server, a plurality of the second identification path information in the first file list to the plurality of first identification path information included in the storage server information;
dividing, by the virtual data intermediate server, the first file list to a plurality of second file lists, if each of the plurality of second identification path information in the first file list corresponds to one of the plurality of first identification path information included in the storage server information, each of the plurality of second file lists including one of the plurality of file reference identifications;
transferring, by the virtual data intermediate server, a plurality of file transfer request and the plurality second file lists to the plurality of virtual storage servers, each of the plurality of second file lists being transferred to one of the plurality of virtual storage servers, which is identified by one of the plurality of second identification path information in the first file list;
receiving, by each of the plurality of virtual storage servers, one of the plurality of file transfer request and a corresponding one of the plurality of second file lists;
sending, by each of the plurality of virtual storage servers, a file, identified by one of the plurality of file reference identifications included in the corresponding one of the plurality of second file lists, to the virtual data intermediate server in response to the one of the plurality of file transfer request and the corresponding one of the plurality of second file lists;
receiving, by the virtual data intermediate server, a plurality of files from the plurality of virtual storage servers; and
sending, by the virtual data intermediate server, a set of the plurality of files to the backup server so that the backup server can backup the set of the plurality of files, which the backup server request to the virtual data intermediate server by the backup request and the first file list.

17. The file control method in accordance with claim 16, further comprising:
storing, by each of the plurality of virtual storage servers, a start path including a path as the basis of a location storing the file, identified by the one of the plurality of file reference identifications included in the corresponding one of the plurality of second file lists.

18. The file control method in accordance with claim 17, further comprising:
adding, by each of the plurality of virtual storage servers, the start path to the corresponding one of the plurality of second file lists.

19. The file control method in accordance with claim 16, further comprising:
retrieving, by each of the plurality of virtual storage servers, data of the file, identified by the one of the plurality of file reference identifications included in the corresponding one of the plurality of second file lists, from an area of a plurality of disk devices in the data server,
wherein the area of the plurality of disk devices is assigned to one of the plurality of virtual storage servers.

20. The file control method in accordance with claim 16, further comprising:
assigning each of the plurality of virtual storage servers to an area of a buffer memory in the data server for exchange data of the file, identified by the one of the plurality of file reference identifications included in the corresponding one of the plurality of second file lists, with the virtual data intermediate server.

* * * * *